United States Patent
Bauer et al.

(10) Patent No.: US 8,443,956 B2
(45) Date of Patent: May 21, 2013

(54) DUAL CLUTCH TRANSMISSION HAVING AREA CONTROLLED CLUTCH COOLING CIRCUIT

(75) Inventors: Karl-Heinz Bauer, Troy, MI (US); Xiaoning Xiang, Troy, MI (US); Melissa Koenig, Howell, MI (US)

(73) Assignee: BorgWarner Inc., Auburn Hills, MI (US)

( * ) Notice: Subject to any disclaimer, the term of this patent is extended or adjusted under 35 U.S.C. 154(b) by 356 days.

(21) Appl. No.: 12/920,471

(22) PCT Filed: Feb. 24, 2009

(86) PCT No.: PCT/US2009/034998
§ 371 (c)(1),
(2), (4) Date: Sep. 1, 2010

(87) PCT Pub. No.: WO2009/111220
PCT Pub. Date: Sep. 11, 2009

(65) Prior Publication Data
US 2011/0042177 A1   Feb. 24, 2011

Related U.S. Application Data

(60) Provisional application No. 61/033,569, filed on Mar. 4, 2008.

(51) Int. Cl.
*F16D 25/12* (2006.01)
(52) U.S. Cl.
USPC ..................................... 192/85.61; 192/85.63
(58) Field of Classification Search
None
See application file for complete search history.

(56) References Cited

U.S. PATENT DOCUMENTS

| | | | |
|---|---|---|---|
| 1,233,561 A | 7/1917 | Dornfeld |
| 2,174,395 A | 9/1939 | Aikman |
| 2,639,013 A | 5/1953 | Meschia |
| 2,919,778 A | 1/1960 | Aschauer |
| 2,943,502 A | 7/1960 | Perkins et al. |
| 3,040,408 A | 6/1962 | Schou |
| 3,171,522 A | 3/1965 | Petrie et al. |
| 3,313,385 A | 4/1967 | Förster |
| 3,362,481 A | 1/1968 | Steinhagen |
| 3,490,312 A | 1/1970 | Seitz et al. |
| 3,534,824 A | 10/1970 | Davison, Jr. |
| 3,537,556 A | 11/1970 | Pfeffer et al. |
| 3,589,483 A | 6/1971 | Smith |
| 3,612,237 A | 10/1971 | Honda |
| 3,654,692 A | 4/1972 | Goetz |
| 3,760,918 A | 9/1973 | Wetrich et al. |

(Continued)

FOREIGN PATENT DOCUMENTS

| | | |
|---|---|---|
| DE | 871857 | 7/1949 |
| DE | 953406 | 11/1956 |

(Continued)

*Primary Examiner* — Rodney Bonck
(74) *Attorney, Agent, or Firm* — Bliss McGlynn, P.C.

(57) ABSTRACT

A dual clutch transmission having a hydraulic circuit for controlling and cooling the clutches of a dual clutch transmission having lube valves in fluid communication with a source of pressurized fluid and wherein the cooling flow is controlled by a solenoid which is adapted to move a valve member to produce a flow area through the valve that is an inverse function of the current delivered to the solenoid and so as to deliver a predetermined control solenoid pressure ultimately to each of the clutches of a dual clutch transmission.

20 Claims, 5 Drawing Sheets

U.S. PATENT DOCUMENTS

| | | |
|---|---|---|
| 3,823,801 A | 7/1974 | Arnold |
| 3,834,503 A | 9/1974 | Maurer et al. |
| 3,858,698 A | 1/1975 | Hause |
| 4,081,065 A | 3/1978 | Smyth et al. |
| 4,205,739 A | 6/1980 | Shelby et al. |
| 4,219,246 A | 8/1980 | Ladin |
| 4,270,647 A | 6/1981 | Leber |
| 4,301,904 A | 11/1981 | Ahlen |
| 4,361,060 A | 11/1982 | Smyth |
| 4,372,434 A | 2/1983 | Aschauer |
| 4,461,188 A | 7/1984 | Fisher |
| 4,476,748 A | 10/1984 | Morscheck |
| 4,501,676 A | 2/1985 | Moorhouse |
| 4,513,631 A | 4/1985 | Koivunen |
| 4,540,078 A | 9/1985 | Wetrich |
| 4,544,057 A | 10/1985 | Webster et al. |
| 4,548,306 A | 10/1985 | Hartz |
| 4,557,363 A | 12/1985 | Golan |
| 4,627,312 A | 12/1986 | Fujieda et al. |
| 4,646,891 A | 3/1987 | Braun |
| 4,662,866 A | 5/1987 | Ehnström |
| 4,667,534 A | 5/1987 | Kataoka |
| 4,667,798 A | 5/1987 | Sailer et al. |
| 4,700,823 A | 10/1987 | Winckler |
| 4,713,980 A | 12/1987 | Ida et al. |
| 4,722,237 A | 2/1988 | McNinch, Jr. |
| 4,732,253 A | 3/1988 | Hiramatsu et al. |
| 4,753,332 A | 6/1988 | Bieber et al. |
| 4,802,564 A | 2/1989 | Stodt |
| 4,808,015 A | 2/1989 | Babcock |
| 4,827,784 A | 5/1989 | Muller et al. |
| 4,841,803 A | 6/1989 | Hamano et al. |
| 4,905,801 A | 3/1990 | Tezuka |
| 4,947,970 A | 8/1990 | Miller et al. |
| 4,957,016 A | 9/1990 | Amedei et al. |
| 5,050,714 A | 9/1991 | Kurihara et al. |
| 5,174,420 A | 12/1992 | DeWald et al. |
| 5,232,411 A | 8/1993 | Hayashi et al. |
| 5,259,476 A | 11/1993 | Matsuno et al. |
| 5,275,267 A | 1/1994 | Slicker |
| 5,284,232 A | 2/1994 | Prud'Homme |
| 5,305,863 A | 4/1994 | Gooch et al. |
| 5,383,544 A | 1/1995 | Patel |
| 5,439,088 A | 8/1995 | Michioka et al. |
| 5,444,623 A | 8/1995 | Genise |
| 5,445,043 A | 8/1995 | Eaton et al. |
| 5,450,934 A | 9/1995 | Maucher |
| 5,469,943 A | 11/1995 | Hill et al. |
| 5,495,927 A | 3/1996 | Samie et al. |
| 5,499,704 A | 3/1996 | Hays |
| 5,505,286 A | 4/1996 | Nash |
| 5,522,775 A | 6/1996 | Maruyama et al. |
| 5,538,121 A | 7/1996 | Hering |
| 5,577,588 A | 11/1996 | Raszkowski |
| 5,609,067 A | 3/1997 | Mitchell et al. |
| 5,613,588 A | 3/1997 | Vu |
| 5,630,773 A | 5/1997 | Slicker et al. |
| 5,634,541 A | 6/1997 | Maucher |
| 5,634,867 A | 6/1997 | Mack |
| 5,662,198 A | 9/1997 | Kojima et al. |
| 5,679,098 A | 10/1997 | Shepherd et al. |
| 5,711,409 A | 1/1998 | Murata |
| 5,720,203 A | 2/1998 | Honda et al. |
| 5,755,314 A | 5/1998 | Kanda et al. |
| 5,782,710 A | 7/1998 | Kosik et al. |
| 5,851,164 A | 12/1998 | Habuchi et al. |
| 5,890,392 A | 4/1999 | Ludanek et al. |
| 5,899,310 A | 5/1999 | Mizuta |
| 5,908,100 A | 6/1999 | Szadkowski et al. |
| 5,915,512 A | 6/1999 | Adamis et al. |
| 5,918,715 A | 7/1999 | Ruth et al. |
| 5,950,781 A | 9/1999 | Adamis et al. |
| 5,964,675 A | 10/1999 | Shimada et al. |
| 5,966,989 A | 10/1999 | Reed, Jr. et al. |
| 5,979,257 A | 11/1999 | Lawrie |
| 6,000,510 A | 12/1999 | Kirkwood et al. |
| 6,006,620 A | 12/1999 | Lawrie et al. |
| 6,012,561 A | 1/2000 | Reed, Jr. et al. |
| 6,026,944 A | 2/2000 | Satou et al. |
| 6,044,719 A | 4/2000 | Reed, Jr. et al. |
| 6,071,211 A | 6/2000 | Liu et al. |
| 6,116,397 A | 9/2000 | Kosumi et al. |
| 6,145,398 A | 11/2000 | Bansbach et al. |
| 6,164,149 A | 12/2000 | Ohmori et al. |
| 6,171,212 B1 | 1/2001 | Reuschel |
| 6,189,669 B1 | 2/2001 | Kremer et al. |
| 6,217,479 B1 | 4/2001 | Brown et al. |
| 6,244,407 B1 | 6/2001 | Kremer et al. |
| 6,269,293 B1 | 7/2001 | Correa et al. |
| 6,286,381 B1 | 9/2001 | Reed, Jr. et al. |
| 6,299,565 B1 | 10/2001 | Jain et al. |
| 6,364,809 B1 | 4/2002 | Cherry |
| 6,393,943 B1 | 5/2002 | Sommer et al. |
| 6,415,213 B1 | 7/2002 | Hubbard et al. |
| 6,419,062 B1 | 7/2002 | Crowe |
| 6,435,049 B1 | 8/2002 | Janasek et al. |
| 6,463,821 B1 | 10/2002 | Reed, Jr. et al. |
| 6,523,657 B1 | 2/2003 | Kundermann et al. |
| 6,536,296 B2 | 3/2003 | Sakamoto et al. |
| 6,602,161 B2 | 8/2003 | Hemmingsen et al. |
| 6,615,966 B2 | 9/2003 | Kato |
| 6,626,056 B2 | 9/2003 | Albert et al. |
| 6,631,651 B2 | 10/2003 | Petrzik |
| 6,656,090 B2 | 12/2003 | Matsumura et al. |
| 6,669,596 B1 | 12/2003 | Sefcik |
| 6,695,748 B2 | 2/2004 | Kopec et al. |
| 6,715,597 B1 | 4/2004 | Buchanan et al. |
| 6,736,751 B1 | 5/2004 | Usoro et al. |
| 6,752,743 B2 | 6/2004 | Eich et al. |
| 6,789,658 B2 | 9/2004 | Busold et al. |
| 6,868,949 B2 | 3/2005 | Braford, Jr. |
| 6,869,382 B2 | 3/2005 | Leising et al. |
| 6,883,394 B2 | 4/2005 | Koenig et al. |
| 6,953,417 B2 | 10/2005 | Koenig |
| 7,311,187 B2 | 12/2007 | Koenig et al. |
| 7,318,512 B2 | 1/2008 | Bauer et al. |
| 7,395,908 B2 * | 7/2008 | Hegerath et al. ............. 192/3.58 |
| 2002/0014386 A1 | 2/2002 | Diemer et al. |
| 2002/0185351 A1 | 12/2002 | Berger et al. |
| 2003/0057051 A1 | 3/2003 | Alfredsson |
| 2003/0075413 A1 | 4/2003 | Alfredsson |
| 2003/0178275 A1 | 9/2003 | Breier et al. |
| 2004/0060378 A1 | 4/2004 | Yamamoto et al. |
| 2004/0060793 A1 | 4/2004 | Dacho et al. |
| 2004/0206599 A1 | 10/2004 | Hegerath |
| 2005/0000774 A1 | 1/2005 | Friedmann |
| 2005/0067251 A1 | 3/2005 | Braford, Jr. et al. |
| 2005/0279605 A1 | 12/2005 | Sowul et al. |
| 2006/0005647 A1 | 1/2006 | Braford et al. |
| 2006/0006042 A1 * | 1/2006 | Koenig ....................... 192/113.3 |
| 2006/0006043 A1 | 1/2006 | Koenig et al. |
| 2006/0009326 A1 | 1/2006 | Stefina |

FOREIGN PATENT DOCUMENTS

| | | |
|---|---|---|
| DE | 1146314 | 3/1963 |
| DE | 1217800 | 5/1966 |
| DE | 3149880 C2 | 7/1982 |
| DE | 3118565 A1 | 11/1982 |
| DE | 3532759 C1 | 3/1987 |
| DE | 19700635 C2 | 8/1997 |
| DE | 10012122 A1 | 9/2000 |
| DE | 10034677 A1 | 2/2002 |
| DE | 10049474 A1 | 4/2002 |
| DE | 10118756 A1 | 5/2002 |
| DE | 10115454 A1 | 8/2002 |
| DE | 10156789 A1 | 8/2002 |
| DE | 10125172 A1 | 11/2002 |
| DE | 10143834 A1 | 3/2003 |
| EP | 0120617 A1 | 10/1984 |
| EP | 0762009 A1 | 3/1997 |
| EP | 0848179 A1 | 6/1998 |
| EP | 1195537 A1 | 4/2002 |
| EP | 1420185 A2 | 11/2003 |
| EP | 1531292 A2 | 11/2004 |
| EP | 1703178 A2 | 9/2006 |
| EP | 1788288 A2 | 5/2007 |
| FR | 1246517 | 10/1960 |

| | | | | | |
|---|---|---|---|---|---|
| FR | 2123828 | 8/1972 | WO | 2004005744 A1 | 1/2004 |
| GB | 2036203 A | 6/1980 | WO | 2006086704 A2 | 8/2006 |
| GB | 2356438 A | 5/2001 | WO | 2009128806 A1 | 10/2009 |
| JP | 4366032 | 12/1992 | | | |
| JP | 8200393 | 8/1996 | | | |
| JP | 2005147403 | 6/2005 | | | |

* cited by examiner

DUAL CLUTCH TRANSMISSION HAVING AREA CONTROLLED CLUTCH COOLING CIRCUIT

BACKGROUND OF THE INVENTION

1. Field of the Invention

The present invention relates, generally, to dual clutch transmissions and, more specifically, to dual clutch transmissions having an area controlled hydraulic circuit used for governing the flow of cooling fluid provided to each of the two clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. These include the manually operated transmission and the automatic transmission.

Manually operated transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, while torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Automated manual transmissions having two clutches are generally referred to simply as dual, or twin, clutch transmissions. The dual clutch structure is most often configured so as to derive power input from a single engine flywheel arrangement. However, some designs have a dual clutch assembly having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

While dual clutch transmissions have overcome several drawbacks associated with conventional transmissions and the newer automated manual transmissions, it has been found that controlling and regulating the automatically actuated dual clutch transmission to achieve the desired vehicle occupant comfort goals is a complicated matter. There are a large number of events to properly time and execute within the transmission for each shift to occur smoothly and efficiently. In addition, the clutch and complex gear mechanisms, working within the close confines of the dual clutch transmission case, generate a considerable amount of heat. The heat build-up is aggravated by the nature of the clutch mechanisms themselves, each of which are typically constructed of two series of plates, or discs, one set connected in some manner to the output of the engine and the second attached to an input shaft of the transmission. Each of the set of plates include friction material. The clutch plates and discs are pressed together under pressure to a point at which the plates and discs make a direct physical connection. The clutch may be designed for a full "lock-up" of the plates and discs, or may be designed with a certain amount of "limited slip". Regardless, the slipping of the friction plates within a friction type clutch, whether from a designed limited slip or the normal uncontrolled slipping that occurs during clutch engagement and disengagement, generates heat that needs to be dissipated. A considerable amount of heat can be generated in the typical dual clutch transmission utilizing a combined coaxial clutch assembly wherein the one clutch fits within the second clutch.

In order to provide sufficient cooling to the clutch assemblies of the conventional dual clutch transmission, the clutch assemblies are usually bathed in transmission fluid in a generally uncontrolled manner. While this approach has generally worked for its intended purpose, disadvantages remain. Specifically, these types of conventional clutch cooling hydraulic circuits have failed either to adequately provide for proper cooling and heat reduction of the clutches of the dual clutch transmission or have resulted in producing large efficiency losses by excessively flooding of the clutch assemblies with fluid.

Newer approaches in the structure of hydraulic circuits for clutch cooling have been proposed in the related art that offer improvements, but are still limited in their cooling capacity. For example, conventional clutch cooling approaches sometimes use a single hydraulic circuit to supply cooling oil or fluid from the cooler device to the clutches. This causes the clutches to suffer inadequate and inefficient heat removal. Furthermore, the inadequacy of these conventional hydraulic circuits is also exaggerated under clutch high loading conditions where excessively high heat is built up rapidly in the active clutch. These inherently inadequate cooling circuit strategies lead to shortened component life and ultimate failure of the clutch assemblies within the dual clutch transmission. Similarly, inadequate cooling is responsible for rapid breakdown of the physical properties of the transmission fluid, which can cause failure of the other components within the transmission. Most transmission cooling strategies are controlled as a function of the fluid pressure provided to the various components. While this type of strategy has generally worked for its intended purpose, there remains a need for better control over the cooling fluid while maintaining low cost. Further, the conventional hydraulic circuits that excessively flood the clutch assemblies with cooling fluid also cause unnecessary clutch drag and put excessive demands on the pump resulting in poor clutch life and lower fuel efficiencies.

Accordingly, there remains a need in the related art for an improved hydraulic circuit to provide cooling fluid to the clutch assemblies of the dual clutch transmissions. Specifically, there is a need for a dual clutch transmission having a clutch cooling circuit wherein the area of the orifices in the valves is opened in a controlled fashion to provide cooling fluid to thereby better control the system fluid flow while maintaining low system cost.

SUMMARY OF THE INVENTION

The disadvantages of the related art are overcome by a dual clutch transmission having a hydraulic circuit for controlling and cooling the clutches of the dual clutch transmission. The hydraulic circuit includes a source of pressurized cooling fluid and first and second lube valves in fluid communication with the source of pressurized fluid. Each of the first and second lube valves include a valve body and a valve member movably supported in the valve body to selectively and independently provide a flow of cooling fluid to each of the clutches of the transmission. Each of the lube valves further includes a biasing member that acts on the valve member to bias it to a normally closed position. First and second control actuators are in fluid communication with a corresponding one of the first and second lube valves. The first and second control actuators are adapted to selectively control the first and second lube valves. Each of the first and second control actuators is in fluid communication with the source of pressurized cooling fluid and includes a valve body, a valve member movably supported by the valve body, and a solenoid. The solenoid is adapted to move the valve member of the control actuator to produce a flow area that is an inverse function of the current delivered to the solenoid and thereby deliver a predetermined control signal pressure to each of the valve members of the first and second lube valves to move the lube valve members against the bias of the biasing member to selectively open the first and second lube valves thereby delivering a controlled, predetermined amount of cooling fluid to the clutches of the dual clutch transmission.

In another embodiment, the present invention is directed toward a dual clutch transmission having a hydraulic circuit including a source of pressurized cooling fluid. First and second lube valves are in fluid communication with the source of pressurized fluid. Each of the first and second lube valves includes a valve body and a valve member movably supported in the valve body to selectively and independently provide a flow of cooling fluid to each of the clutches of the dual clutch transmission. Each of the lube valves includes a biasing member that acts on the valve member to bias it to a normally closed position and a solenoid. The solenoid is adapted to move the valve member against the bias of the biasing member to produce a flow area that is an inverse function of the current delivered to the solenoid to selectively open the first and second lube valves thereby delivering a controlled, predetermined amount of cooling fluid to the clutches of the dual clutch transmission.

In yet another embodiment, the present invention is directed toward a dual clutch transmission having a hydraulic circuit for controlling and cooling the clutches of the dual clutch transmission. The hydraulic circuit includes a source of pressurized cooling fluid. A lube valve is in fluid communication with the source of pressurized fluid. The lube valve includes a valve body and a valve member movably supported in the valve body to selectively provide a flow of cooling fluid to the clutches of the dual clutch transmission. The lube valve includes a biasing member that acts on the valve member to bias it to a normally closed position. A control actuator is in fluid communication with the lube valve and is adapted to selectively control the lube valve. The control actuator is in fluid communication with the source of pressurized cooling fluid and includes a valve body, a valve member movably supported by the valve body and a solenoid. The solenoid is adapted to move the valve member of the control actuator to produce a control signal pressure from the control actuator that is an inverse function of the current delivered to the solenoid and to deliver a predetermined amount of pressurized fluid to the valve member of the lube valve to move the valve member against the bias of the biasing member to thereby deliver a controlled, predetermined amount of cooling fluid through the lube valve. In addition, the hydraulic circuit further includes a cooling switch valve in fluid communication with the lube valve. The cooling switch valve is adapted to deliver a controlled, predetermined amount of cooling fluid received from the lube valve to alternate ones of the clutches of the dual clutch transmission.

In yet another embodiment, the present invention is directed toward a dual clutch transmission having a hydraulic circuit for controlling and cooling the clutches of the dual clutch transmission. The hydraulic circuit includes a source of pressurized cooling fluid. A lube valve is in fluid communication with the source of pressurized fluid. The lube valve includes a valve body and a valve member movably supported in the valve body to selectively and independently provide a flow of cooling fluid to each of the clutches of the dual clutch transmission. The lube valve further includes a biasing member that acts on the valve member to bias it to a normally closed position and a solenoid. The solenoid is adapted to move the valve member against the bias of the biasing member to produce a flow area through the lube valve that is an inverse function of the current delivered to the solenoid to selectively open the lube valve. In addition, the transmission includes a cooling switch valve in fluid communication with the lube valve and alternating ones of the clutches. The cooling switch valve is adapted to deliver a controlled, predetermined amount of cooling fluid received from the lube valve to alternate ones of the clutches of the dual clutch transmission.

Thus, the present invention overcomes the limitations of dual clutch transmission employing current hydraulic circuits for clutch cooling by providing dual clutch transmission having a clutch cooling circuit wherein the area of the orifices in the valve are opened in a controlled fashion to provide cooling fluid to thereby better control the system fluid flow while maintaining low system cost.

Other objects, features, and advantages of the present invention will be readily appreciated, as the same becomes better understood after reading the subsequent description taken in connection with the accompanying drawings.

DETAILED DESCRIPTION

Figure 1:
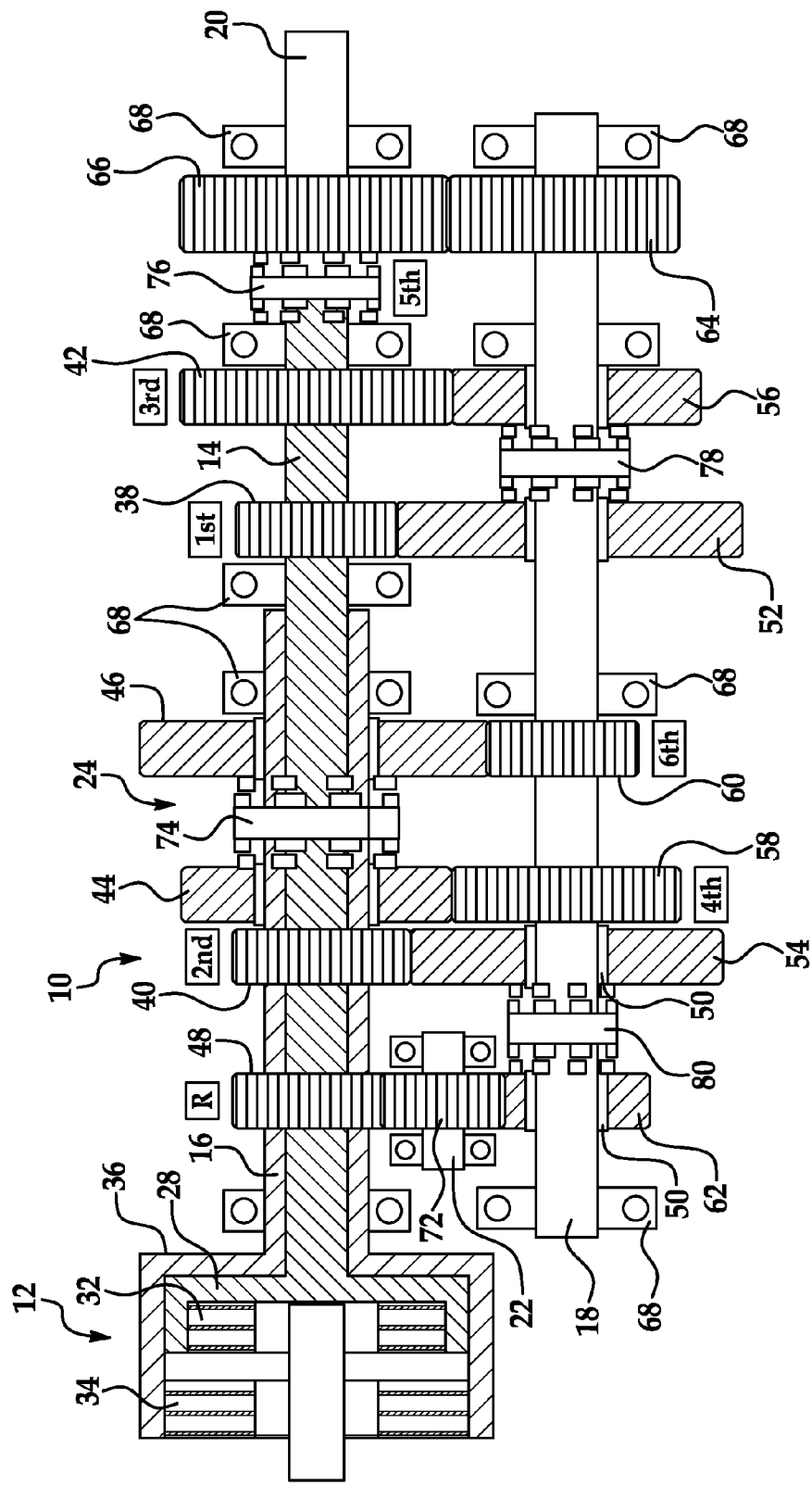
FIG. 1 is a schematic illustration of a dual clutch transmission of the type that may employ the clutch cooling circuit of the present invention.

A representative example of the dual clutch transmission of the present invention is generally indicated at 10 in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by a plurality of shift actuators (commonly known, but not shown in the drawings) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As shown in one embodiment illustrated in FIG. 1, the first and second clutch mechanisms 32, 34 are coaxial such that the outer case 28 of the first clutch mechanism 32 fits inside of the outer case 36 of the second clutch mechanism 34. Similarly, the first and second input shafts 14, 16 are also coaxial such that the second input shaft 16 is hollow having an inside diameter sufficient to allow the first input shaft 14 to pass through and be partially supported by the second input shaft 16. It should be appreciated that the first and second clutch mechanisms 32, 34 may be physically arranged within the transmission concentrically, rather than the parallel structure illustrated in FIG. 1. Similarly, the first and second input shafts may be arranged in parallel relative to one another with clutches side by side.

The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

It should be further appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below is merely a portion, such as a sub-routine, or series of sub-routines, of a larger control scheme within the ECU.

The first and second clutch mechanisms 32 and 34 of the dual clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. This powershift changeover of the clutches 32 and 34 occurs for each shift change of the dual clutch transmission 10. As the inactive clutch (now the on-coming clutch) is engaged, the load applied causes a surge of power to be transferred across the clutch with an accompanying generation of heat from the slip that occurs across the clutch. The temperature of the on-coming clutch rapidly increases, or spikes, to a point where the clutch plates or the friction material could be damaged if proper cooling is not provided. Additionally, the heat build-up, if not properly dissipated, will greatly increase the overall temperature of the dual clutch transmission 10 and may cause the damaging effects mentioned above. Simultaneously, while the temperature of the on-coming clutch is sharply rising, the disengaging, or off-going, clutch will cease transmitting torque. With the removal of the load, the disengaged clutch will stop generating heat, thus sharply lowering its cooling requirement.

Figure 2:
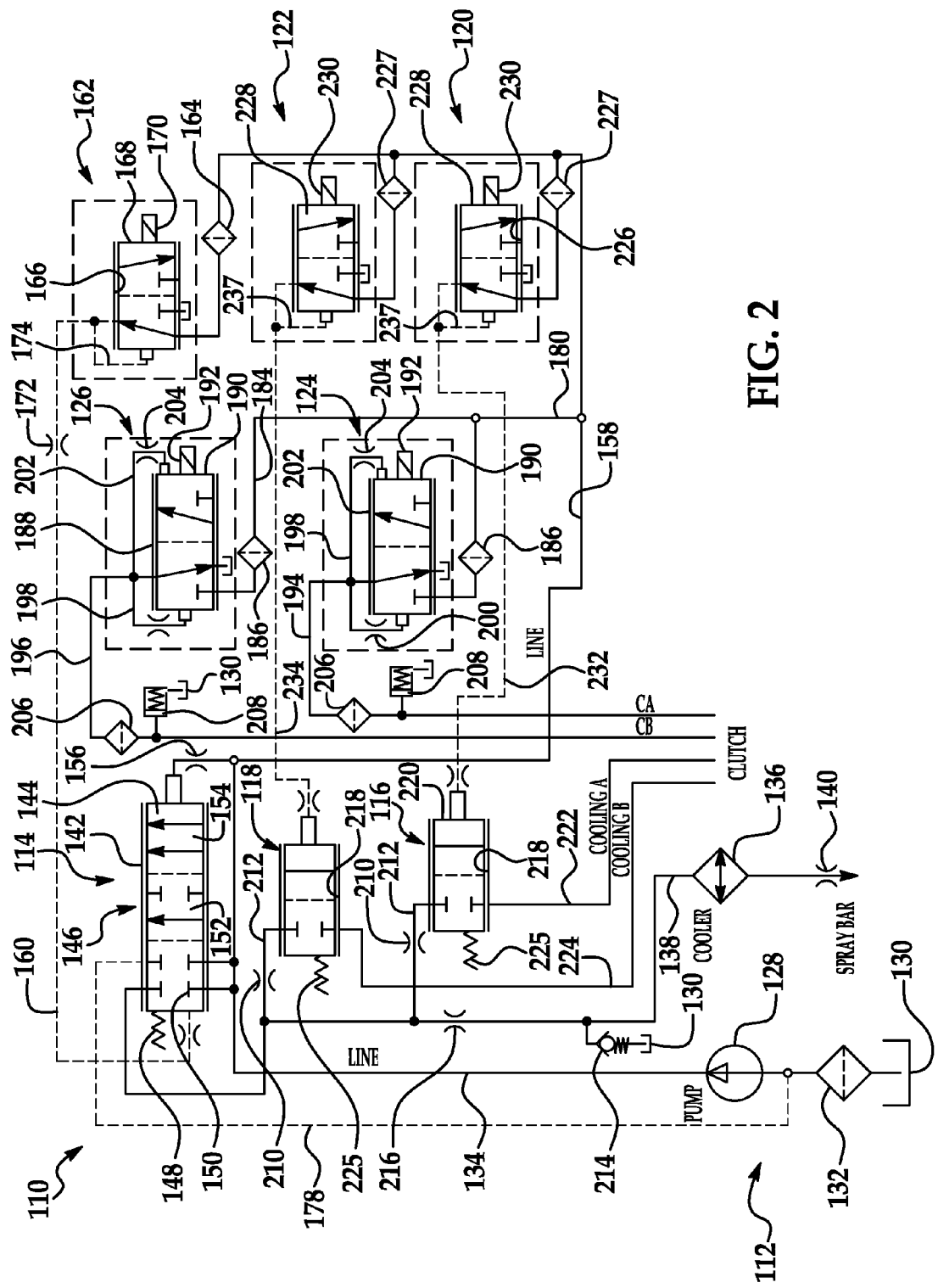
FIG. 2 is a schematic illustration of one embodiment of the hydraulic cooling circuit of the present invention for cooling the clutches of a dual clutch transmission.

A hydraulic circuit for controlling and cooling the clutches 32, 34 of the dual clutch transmission is generally indicated at 110 in FIG. 2, where like numerals are used to designate like components throughout the figures. Generally speaking, the hydraulic circuit 110 includes a source of pressurized cooling, generally indicated at 112, a main pressure regulator, generally indicated at 114 disposed in fluid communication with the source of pressurized fluid 112 and adapted to provide a predetermined set system pressure for the hydraulic circuit 110. In addition, the hydraulic circuit 110 further includes first and second lube valves, generally indicated at 116 and 118, respectively. The first and second lube valves 116, 118 are similarly disposed in fluid communication with the source of pressurized fluid 112. First and second control actuators, generally indicated at 120, 122, are in fluid communication with a corresponding one of the first and second lube valves 116, 118, respectively, and are adapted to selectively control the first and second lube valves, as will be described in greater detail below. The hydraulic circuit 110 also includes first and second clutch actuation valves, generally indicated at 124, 126 that are similarly in fluid communication with the source of pressurized cooling fluid 112. Each of the first and second clutch actuation valves 124, 126 correspond to one of the two clutches 32, 34 of the dual clutch transmission and are adapted to provide pressurized fluid to each of the corresponding ones of the clutches 32, 34 of the dual clutch transmission to actuate the clutches. Each of these components of the hydraulic circuit 110 illustrated in FIG. 2 will be described in greater detail below.

The source of pressurized cooling fluid 112 includes a pump 128 that draws the cooling fluid from a sump 130 through a filter 132 and supplies the pressurized cooling fluid through a main pressure line 134 to the main pressure regulator 114. A cooling unit 136 is in fluid communication with the source of pressurized fluid through line 138 and is adapted to exchange heat from the cooling fluid with other media. The heated cooling fluid passes through the cooling unit, past a restrictor 140, back to the sump 130.

The main pressure regulator 114 maintains the pressure in the regulated line 158 at a predetermined operating pressure, or set point as will be described in greater detail below. The main pressure regulator 114 is schematically shown in FIG. 2 in its closed position and includes a valve body 142 with a valve member 144 movably supported within the valve body 142. The main pressure regulator 114 also includes internal flow passages, generally indicated at 146 and a biasing member 148 which acts on the valve member 144 to bias it to the right as illustrated in this figure. The flow passages 146 are shown in left 150, middle 152, and right 154 positions of the valve member 144. Pressure in the main pressure line 134 is supplied to the right side of the main regulator valve 114 through a flow restrictor 156 that reduces the flow volume but maintains the applied pressure. With the pump 128 operating, the pressure delivered to the right side of the main pressure regulator 114 overcomes the spring force of the biasing member 148 and moves the valve member 144 of the main pressure regulator 114 to the left from the closed position 154 to the middle operating position 152. Here, the internal flow passages of the middle operating position 152 allow the main pressure line to flow into the second priority cooling channel 212. A regulating control line 160, shown as a dotted line in FIG. 2, provides a controllable biasing force to the left side of the main pressure regulator 114. The regulating control line 160 delivers a portion of the system pressure to the left side of the main pressure regulator 114 under the control of the line pressure control valve 162.

The line pressure control valve 162 is electrically operated by an electronic control unit (ECU) to set the regulated pressure set point within the hydraulic circuit 110 and then to maintain the desired pressure by regulating the output pressure to the set point. The line pressure control valve 162 supplies a varying portion of the available main pressure through the regulating line 160 to the main pressure regulator 114 by regulating a portion of the main pressure that is supplied through the filter 164 to the valve 162. More specifically, the line pressure control valve 162 is schematically illustrated in FIG. 2 and includes a valve body 166, a valve member 168 movably supported by the valve body 166, and a solenoid 170. The solenoid 170 is adapted to move the valve member 168 of the line pressure control valve 162 to produce a regulated pressure that is an inverse function of the current delivered to the solenoid 170 and to deliver a predetermined amount of pressurized fluid to the left side of the main pressure regulator 114 through a flow restrictor 172 to assist in moving the valve member 144 of the main pressure regulator 114 to the closed position and against the force generated by the line pressure feedback pressure acting on the right side of the valve member 144 through the flow restrictor 156. In this manner, the line pressure control valve 162 sets the desired output pressure set point for the main pressure regulator 114.

The line pressure control valve 162 then varies the pressure in the regulating line to maintain the output pressure delivered from the main pressure regulator 114 about the desired output pressure set point while accounting for fluctuations in the output pressure due to downstream pressure changes. Line 174 provides feedback pressure from the regulating control line 160 and delivers it to the left side of the line pressure control valve 162 as illustrated in FIG. 2 to assist in returning the valve member 168 to its closed position.

The main pressure regulator 114 also provides control over rapid increases, or surges, in the main pressure line. The right position 154 of the main regulator valve member 144 opens additional flow passages 146 that not only allow for the continued flow of fluid through the main pressure regulator 114 to the regulated line 158 and second priority cooling, but also allow a portion of the increased flow to pass to the suction line 178. The suction line 178 normally remains closed off by the left and middle positions 150, 152 of the main pressure regulator valve member 144. However, when a sharp or rapid increase of pressure in the main pressure line 134 drives the main pressure regulator valve member 144 all the way to the left, a corrective portion of the flow is fed back to the suction side of the pump 128. As the suction line 178 bleeds off the surge of excessive pressure flow, the main regulator valve member 144 moves back to the middle, operative position 152.

The regulated line 158 supplies pressurized fluid to the first and second clutch actuation valves 124, 126 via actuation line 180 and associated branches 182, 184. Before reaching each of the first and second clutch actuation valves, the fluid is filtered at 186. Each of the first and second clutch actuation valves 124, 126 includes a valve body 188, a valve member 190 movably supported within the valve body 188 and a solenoid 192. The solenoid 192 is adapted to move the valve member 190 to produce a flow area through the clutch actuation valves 124, 126 to deliver a predetermined amount of pressurized fluid to each of the clutches 32, 34 through delivery lines 194, 196, respectively, thereby selectively actuating same. The first and second clutch actuation valves 124, 126 are controlled by the ECU to selectively engage and disengage the respective clutch. A valve return line 198 provides a feedback force through a flow restrictor 200 in a direction opposite to the actuation of the solenoid 192. Similarly, a valve balance line 202 provides a lesser feedback force through a flow restrictor 204 on the solenoid side of the valve member 190. Each of the first and second clutch actuation valves 124, 126 also includes an output filter 206 and a damper 208 downstream of the clutch actuation valves and in advance of the clutches to provide a maximum upper limit for the pressure supplied to actuate the clutches. In their non-operative mode, each of the first and second clutch actuation valves 124, 126 returns any pressurized fluid to the sump 130. As shown in FIG. 1, each of the first and second clutch actuation valves 124, 126 is shown in its non-operative position.

As noted above, the first and second lube valves 116, 118 are in fluid communication with the source of pressurized fluid 112. More specifically, the main pressure regulator 114 is disposed in fluid communication between the pump 128 and the first and second lube control valves 116, 118 through flow restrictors 210 via second priority cooling channels 212. A pressure relief valve 214 is operatively connected in fluid communication with the lube control valves 116, 118 to provide a maximum upper limit for the positive pressure provided through the main pressure regulator 114 to the cooler and the first and second lube valve via flow restrictor 216. Each of the first and second lube valves 116, 118 include a valve body 218 and a valve member 220 movably supported in the valve body 218 to selectively and independently provide a flow of cooling fluid to each of the clutches 32, 34 of the dual clutch transmission through respective cooling lines 222, 224. To this end, each of the lube valves includes a biasing member 225 that acts on the valve member to bias it to a normally closed position.

As noted above, first and second control actuators 120, 122 are in fluid communication with a corresponding one of the first and second lube valves 116, 118 and are adapted to selectively control the first and second lube valves. Accordingly, each of the first and second control actuators 120, 122 is in fluid communication with the source of pressurized cooling fluid through the regulated line 158 via the main pressure regulator 114 and the filters 227. Each of the first and second control actuators 120, 122 includes a valve body 226, a valve member 228 movably supported by the valve body 226 and a solenoid 230. The solenoid 230 is adapted to move the valve member 228 of the control actuator to produce a signal pressure that is an inverse function of the current delivered to the solenoid 230 and to deliver a predetermined amount of pressurized fluid through lines 232 and 234 (shown as dotted lines) to the right side of each of the valve members 220 of the first and second lube valves 116, 118 (as illustrated in FIG. 2). Line 237 provides the feedback pressure from the pressurized fluid lines 232, 234 and delivers it to the left side of the first and second control actuators 120, 122 as illustrated in FIG. 2 to assist in returning the valve members 228 to their closed positions. In this way, a controlled signal pressure is provided to the right hand side of the first and second lube control valves 116, 118 to move their respective valve members 220 against the bias of the biasing member 225 to selectively open the first and second lube valves, thereby delivering a controlled, predetermined amount of cooling fluid to the clutches of the dual clutch transmission.

In operation, pressurized cooling fluid is supplied by the pump 128 into the main pressure line 134. This pressurized cooling fluid is regulated by the main pressure regulator 114 which supplies line pressure through the regulated line 158 to the rest of the hydraulic circuit 110. The main pressure regulator is controlled by the pressure control valve 162, which in turn is controlled by the ECU to establish a system pressure. Similarly, first and second clutch actuation valves 124, 126 are controlled by the ECU to selectively provide pressurized fluid to the clutches 32, 34 through delivery lines 194, 196, thereby actuating same. First and second control actuators 120, 122 are similarly controlled by the ECU to provide a predetermined amount of pressurized fluid which acts on the right hand side of the first and second lube valves 116, 118, respectively. More specifically, each of the solenoids 230 of the first and second control actuators 120, 122 is adapted to move their respective valve members 228 to produce a controlled signal pressure that is an inverse function of the current delivered to the solenoid 230 and to deliver a predetermined amount of pressurized fluid through lines 232 and 234 to the right side of each of the valve members 220 of the first and second lube valves 116, 118. This in turn controls the actuation of each of the first and second lube valves 116, 118 to provide a selected, predetermined amount of cooling fluid to each of the clutches 32, 34 of the dual clutch transmission.

Figure 3:
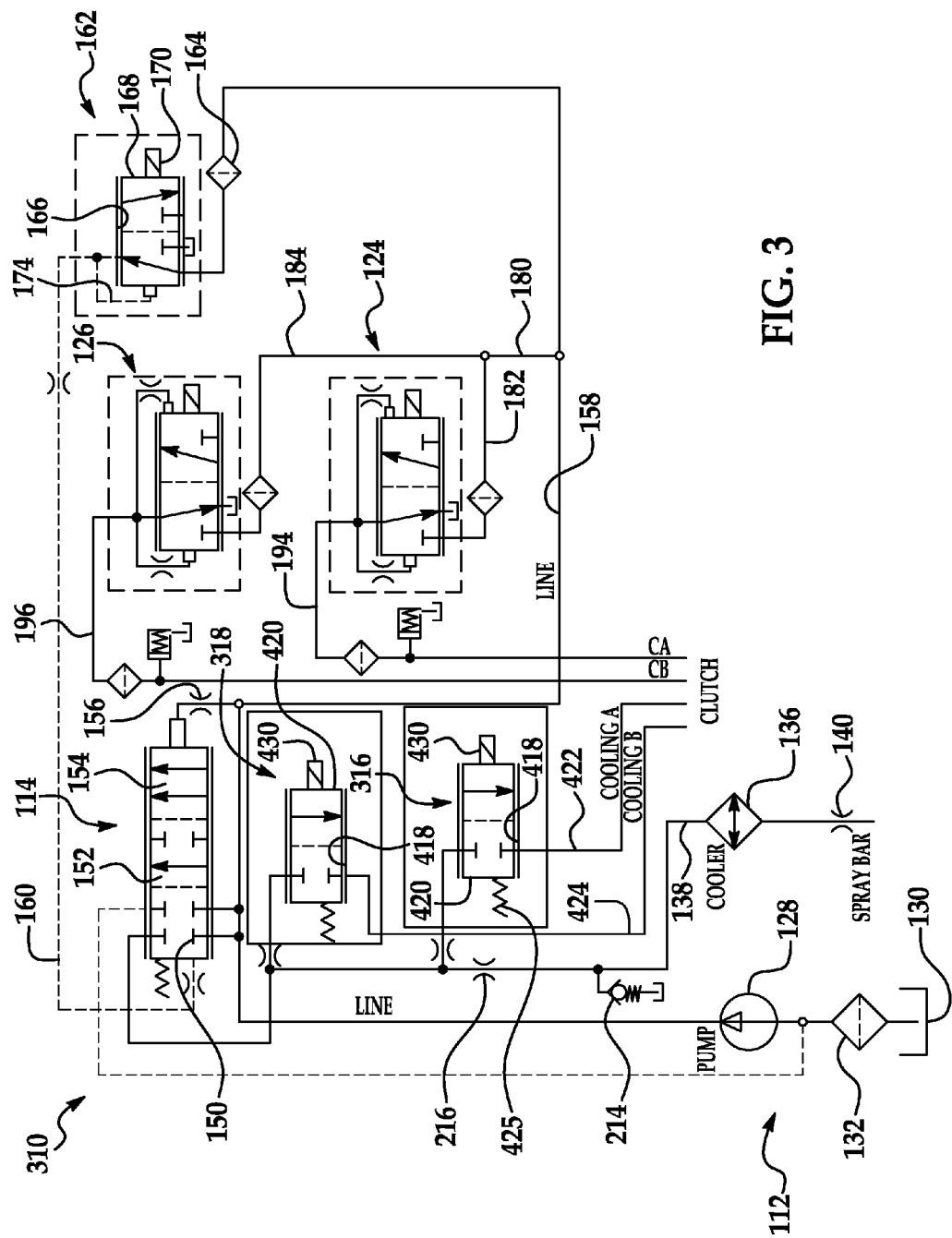
FIG. 3 is a schematic illustration of another embodiment of the hydraulic cooling circuit of the present invention for cooling the clutches of a dual clutch transmission.

Another embodiment of the hydraulic circuit employed for controlling and cooling the clutches of a dual clutch transmission is generally indicated at 310 in FIG. 3, where like numerals are used to indicate like structure with respect to the hydraulic circuit illustrated in FIG. 2. Thus, the same reference numerals are employed to designate the same structure as between the two drawings. Additional and different structure illustrated in FIG. 3 is designated with like numerals, increased by 200, with respect to the structure illustrated in FIG. 2. More specifically, the hydraulic circuit 310 illustrated in FIG. 3 is substantially similar to the hydraulic circuit 110 illustrated in FIG. 2, except that the first and second control actuators 120, 122 and their associated pressure delivery lines, filters, flow restrictors and relief valves have been eliminated in favor of direct-acting first and second lube valves, generally indicated at 316, 318. Thus, the source of pressurized cooling fluid 112, main pressure regulator 114, first and second clutch actuation valves 124, 126, as well as their associated filters, flow restrictors, dampers and pressure lines are the same as that illustrated in FIG. 2. Accordingly, each of these components illustrated in FIG. 3 has been labeled with the same reference number as shown in FIG. 2.

Like the lube valves 116, 118 illustrated in FIG. 2, the first and second lube valves 316, 318 illustrated in FIG. 3 include a valve body 418 and a valve member 420 movably supported in the valve body 418 to selectively and independently provide a flow of cooling fluid to each of the clutches 32, 34 of the dual clutch transmission through respective cooling lines 422, 424. To this end, each of the first and second lube valves includes a biasing member 425 that acts on the valve member 420 to bias it to a normally closed position and a solenoid 430. The solenoid 430 is adapted to move the valve member 420 of the respective lube valve 316, 318 to the left as illustrated in FIG. 3 against the biasing force of the biasing member 425 so as to produce a flow area through the respective lube valve that is function of the current delivered to the solenoid 430 and to deliver a predetermined amount of pressurized fluid through lines 422, 424 to the clutches 32, 34 of the dual clutch transmission. The actuation of the solenoid 430 is controlled by the ECU.

Figure 4:
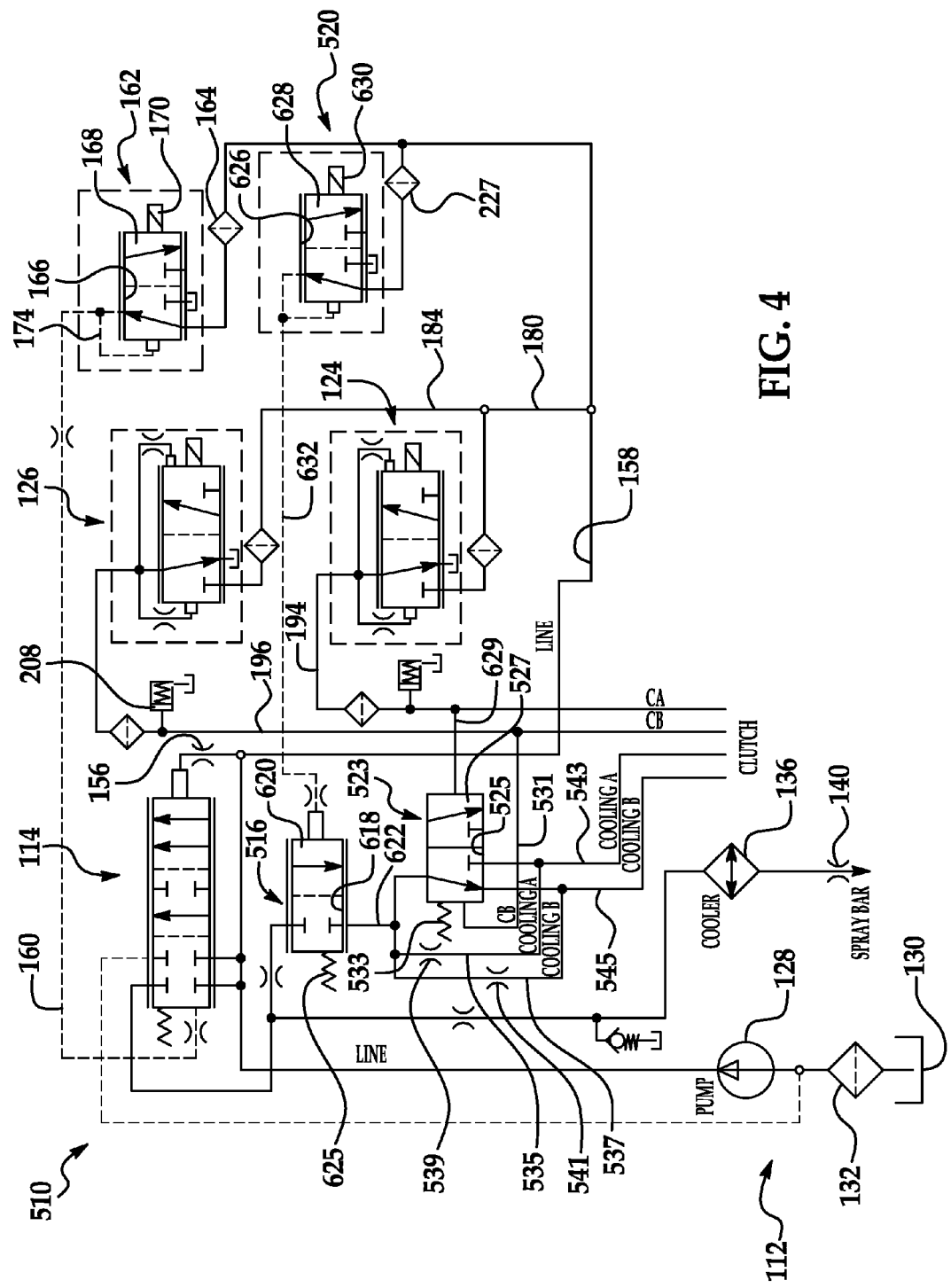
FIG. 4 is a schematic illustration of another embodiment of the hydraulic cooling circuit of the present invention for cooling each of the clutches of a dual clutch transmission.

Another embodiment of a hydraulic circuit employed for controlling and cooling the clutches of a dual clutch transmission is generally indicated at 510 in FIG. 4, where like numerals are used to designate like structure with respect to the hydraulic circuit illustrated in FIG. 2. Thus, the same reference numerals are employed to designate the same structure as between these two drawings. Additional and different structure illustrated in FIG. 4 is designated with like numerals increased by 400 with respect to the structure illustrated in FIG. 2. More specifically, the hydraulic circuit 510 illustrated in FIG. 4 is substantially similar to that illustrated in FIG. 2, except that the second control actuator 122 and the second lube valve 118 as well as the associated pressure delivery lines, filters, and flow restrictors have been eliminated in favor of a single lube valve 516 that is controlled by a single control actuator 520 that both cooperate in conjunction with a cooling switch valve, generally indicated at 523. Thus, the source of pressurized cooling 112, the main pressure regulator 114, first and second clutch actuation valves 124, 126 as well as the associated filters, flow restrictors, relief valves and pressure lines are the same as that illustrated in FIG. 2. Accordingly, each of these components illustrated in FIG. 4 have been labeled with the same reference numbers as shown in FIG. 2. Moreover, the lube valve 516 and control actuator 520 illustrated in FIG. 4 operate in the same way with respect to one another and the other components illustrated in FIG. 4 as the first lube valve 116 and first control actuator 120 illustrated in FIG. 2.

Like the lube valve 116 illustrated in FIG. 2, the lube valve 516 illustrated in FIG. 4 includes a valve body 618 and a valve member 620 movably supported in the valve body 618 to selectively and independently provide a flow of cooling fluid to each of the clutches 32, 34 of the dual clutch transmission through the cooling switch valve 523 via cooling line 622. To this end, the lube valve 516 includes a biasing member 625 that acts on the valve member 620 to bias it to a normally closed position.

The cooling switch valve 523 receives cooling fluid delivered through the lube valve 516 and selectively directs this cooling fluid to one or other of the dual clutches 32, 34 of the transmission. To this end, the cooling switch valve 523 includes a valve body 525 and a valve member 527 movably supported within the valve body 525. The cooling switch valve 523 is effectively controlled by the actuation of the clutch actuation valves 124, 126. Thus, the majority of pressurized cooling fluid is delivered to the respective clutch upon its actuation of the associated clutch actuation valve 124, 126. To this end, the cooling switch valve 523 receives a pressure bias on the right side of the valve member 527 as illustrated in FIG. 4 via line 529 delivered from the clutch actuation valve 124 through line 194 to direct cooling fluid through the cooling switch valve 523 and line 543 to the clutch 34. Similarly, upon actuation of the clutch actuation valve 126 the cooling switch valve 523 receives a bias on the left side of the valve member 527 via line 531 from pressure line 196 to selectively provide pressurized cooling fluid through the cooling switch valve 523 and line 545 to the second clutch 32 of the dual clutch transmission. A biasing member 533 biases the valve member 527 to the normally closed position and to the right as illustrated in FIG. 4. A selected amount of cooling fluid may also be supplied from the lube valve 516 to each of the clutches 32, 34 through lines 535, 537 and flow restrictors 539, 541 independent of the clutch actuation valves 124, 126.

Like the first control actuator 120 illustrated in FIG. 2, the control actuator 520 illustrated in FIG. 4 is in fluid communication with the source of pressurized cooling through the regulated line 158 via the main pressure regulator 114 and the filter 227. The control actuator 520 includes a valve body 626, a valve member 628 movably supported by the valve body 626 and a solenoid 630. The solenoid 630 is adapted to move the valve member 628 of the control actuator 520 to produce a flow area through the control actuator that is an inverse function of the current delivered through the solenoid 630 and to deliver a predetermined amount of pressurized fluid through line 632 (shown as a dotted line) to the right side of the valve member 620 of the lube valve 616 (as illustrated in FIG. 4).

In this way, a controlled amount of cooling fluid is provided to the right hand side of the lube valve 516 to move its valve member 620 against the bias of the biasing member 625 to selectively open the valve, thereby delivering a controlled predetermined amount of cooling fluid to the cooling switch valve 523. The operation of the cooling switch valve 523 is effectively controlled by the actuation of the clutch actuation valves 124, 126 to selectively provide cooling fluid to the clutch that is actuated at any given time.

Figure 5:
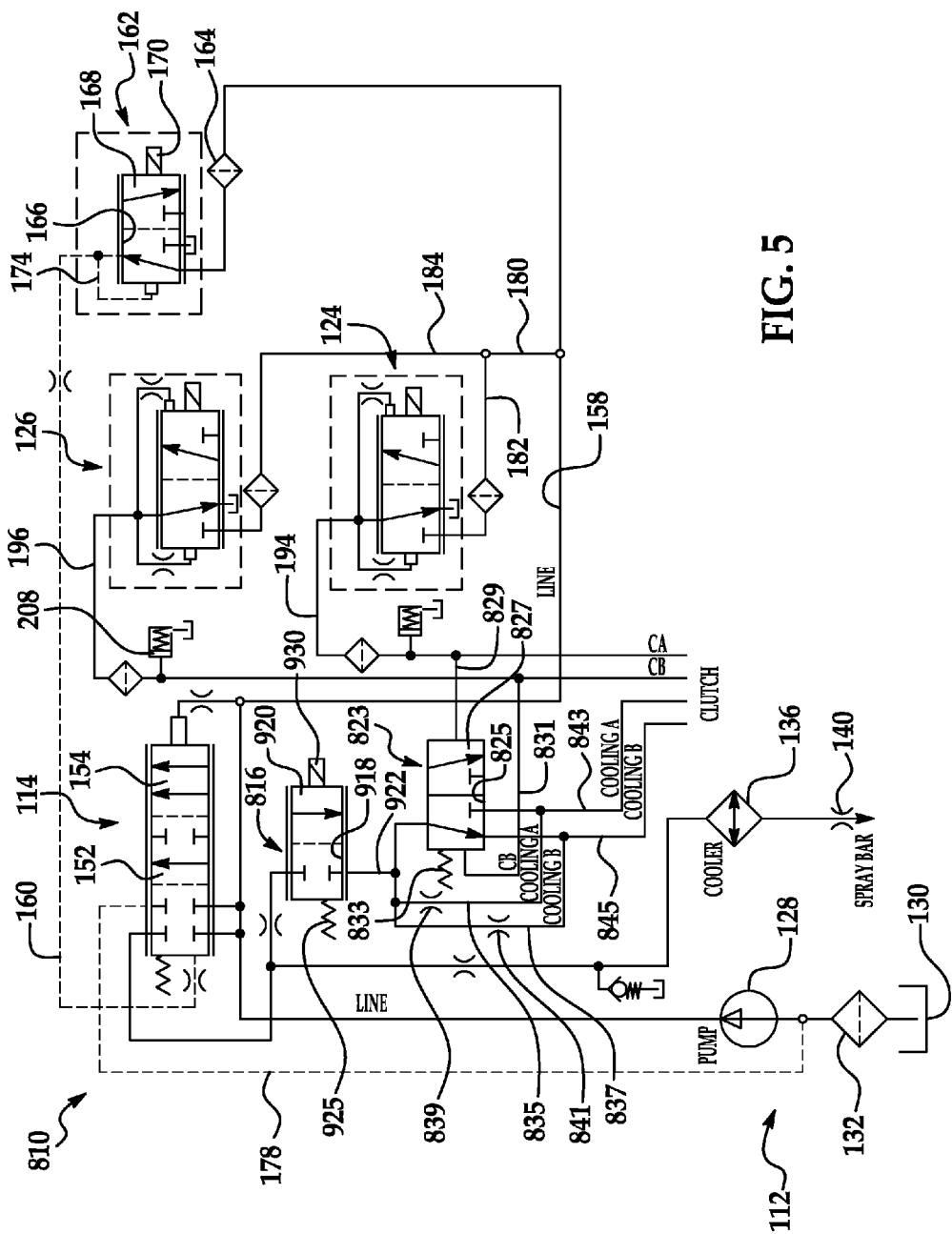
FIG. 5 is a schematic illustration of another embodiment of the hydraulic cooling circuit of the present invention for cooling each of the clutches of a dual clutch transmission.

Another embodiment of the hydraulic circuit employed for controlling and cooling the clutches of a dual clutch transmission is generally indicated at 810 in FIG. 5, where like numerals are used to indicate like structure with respect to the hydraulic circuit illustrated in FIG. 2. Thus, the same reference numerals are employed to designate the same structure as between the two drawings. Additional and different structure illustrated in FIG. 5 is designated with like numerals, increased by 700, with respect to the structure illustrated in FIG. 2. More specifically, the hydraulic circuit 810 illustrated in FIG. 5 is substantially similar to the hydraulic circuit 110 illustrated in FIG. 2, except that the first and second control actuators 120, 122 and their associated pressure delivery lines, filters, and flow restrictors have been eliminated in favor of a direct-acting lube valve, generally indicated at 816 that cooperates with a cooling switch valve 823. Thus, the source of pressurized cooling fluid 112, main pressure regulator 114, first and second clutch actuation valves 124, 126, as well as their associated filters, flow restrictors and pressure lines are the same as that illustrated in FIG. 2. Accordingly, each of these components illustrated in FIG. 5 has been labeled with the same reference number as shown in FIG. 2.

Like the lube valves 116, 118 illustrated in FIG. 2, the lube valve 816 illustrated in FIG. 5 include a valve body 918 and a valve member 920 movably supported in the valve body 918 to selectively and independently provide a flow of cooling fluid to each of the clutches 32, 34 of the dual clutch transmission through the cooling switch valve 823 via cooling line 922. To this end, the lube valve 816 includes a biasing member 925 that acts on the valve member 920 to bias it to a normally closed position and a solenoid 930. The solenoid 930 is adapted to move the valve member 920 of the respective lube valve 816 to the left as illustrated in FIG. 5 so as to produce a flow area through the lube valve 816 that is an inverse function of the current delivered to the solenoid 930 and to deliver a predetermined amount of pressurized fluid through lines 922 to the cooling switch valve 823.

The cooling switch valve 823 receives cooling fluid delivered through the lube valve 816 and selectively directs this cooling fluid to one or other of the dual clutches 32, 34 of the transmission. To this end, the cooling switch valve 823 includes a valve body 825 and a valve member 827 movably supported within the valve body 825. The cooling switch valve 823 is effectively controlled by the actuation of the clutch actuation valves 124, 126. Thus, the majority of pressurized cooling fluid is delivered to the respective clutch upon its actuation of the clutch actuation valves 124, 126. To this end, the cooling switch valve 823 receives a pressure bias on the right side of the valve member 827 as illustrated in FIG. 5 via line 829 delivered from the clutch actuation valve 124 through line 194 to direct cooling fluid through the cooling switch valve 823 to the clutch 34 via pressure line 843. Similarly, upon actuation of the clutch actuation valve 126 the cooling switch valve 823 receives a bias on the left side of the valve member 827 via line 831 from pressure line 196 to selectively provide pressurized cooling fluid to the second clutch 32 of the dual clutch transmission via pressure line 845. A biasing member 833 biases the valve member 827 to the normally closed position and to the right as illustrated in FIG. 5. A selected amount of cooling fluid may also be supplied from the lube valve 816 to each of the clutches 32, 34 through lines 835, 837 and flow restrictors 839, 841 independent of the clutch actuation valves 124, 126. Flow restrictors 839, 841 stabilize the applied volume of cooling fluid and prevent surges of cooling fluid to the clutches as the supply flow is regulated.

In this way, the solenoid 930 acts on the right hand side of the lube valve 816 to move its valve member 920 against the bias of the biasing member 925 to selectively open the valve, thereby delivering a controlled predetermined amount of cooling fluid to the cooling switch valve 823. The operation of the cooling switch valve 823 is effectively controlled by the actuation of the clutch actuation valves 124, 126 to selectively provide cooling fluid to the clutch that is actuated at any given time.

It should also be appreciated that other routing arrangements may also be employed without departing from the scope of the present invention. Furthermore, the cooling unit 136 may be a heat exchanger physically disposed outside of the transmission and exposed to an air stream to allow heat to transfer from the cooling fluid to the air stream. The cooling unit may also be outside of the transmission and physically disposed within another heat exchanger within the vehicle, such as the vehicle's main radiator so that the cooling unit is exposed to the liquid media of the radiator to allow heat to transfer from said cooling fluid to the liquid media.

Thus, the present invention overcomes the limitations of dual clutch transmission employing current hydraulic circuits for clutch cooling by providing dual clutch transmission having a clutch cooling circuit wherein the area of the orifices in the valve are opened in a controlled fashion to provide cooling fluid to thereby better control the system fluid flow while maintaining low system cost.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

The invention claimed is:

1. A dual clutch transmission (10) having a hydraulic circuit (110) for controlling and cooling the clutches (32, 34) of the dual clutch transmission, said dual clutch transmission (10) comprising:

said hydraulic circuit (110) having a source o pressurized cooling fluid (112);

first and second lube valves (116, 118) in fluid communication with said source of pressurized fluid (112), each of said first and second lube valves including a lube valve body (218) and a lube valve member (220) movably supported in said lube valve body to selectively and independently provide a flow of cooling fluid to each of the clutches (32, 34) of the dual clutch transmission with each of said lube valves (116, 118) including a biasing member (225) that acts on said lube valve member (220) to bias it to a normally closed position; and first and second control actuators (120, 122) at fluid communication with a corresponding one of said first and second lube valves (116, 118) and adapted to selectively control said first and second lube valves, each of said first and second control actuators in fluid communication with said source of pressurized cooling fluid (112) and including an actuator valve body (226), an actuator valve member (228) movably supported by said actuator valve body and a solenoid (230), said solenoid adapted to move said actuator valve member (228) of said control actuator to produce a signal pressure that is an inverse function of the current delivered to said solenoid (230) and to deliver a predetermined control signal pressure to each of said lube valve members (220) of said first and second lube valves (116, 118) to move said lube valve members against the bias of said biasing member (225) to selectively open said first and second lube valves thereby delivering a controlled, predetermined amoral, of cooling fluid to the clutches (32, 34) of the dual clutch transmission (10).

2. The dual clutch transmission (10) as set forth in claim 1 further including first and second clutch actuation valves (124, 126) in fluid communication with said source of pressurized cooling fluid (112) and a corresponding one of the two clutches of the dual clutch transmission, each of said first and second clutch actuation valves (124, 126) adapted to provide pressurized fluid to each of a corresponding one of the clutches of a dual clutch transmission to actuate same.

3. The dual clutch transmission (10) as set forth claim 1 further including a main pressure regulator (114) in fluid communication with said source of pressurized fluid (112) and adapted to provide a predetermined set system pressure for said hydraulic circuit (110).

4. The dual clutch transmission (10) as set forth in claim 3 wherein said main pressure regulator (114) is disposed in fluid communication between said source of pressurized cooling fluid (112) and said first and second lube control valves (116, 118) and said first and second control actuators (120,122).

5. A dual clutch transmission (10) having a hydraulic circuit (310) for controlling and cooling the clutches (32,34) of the dual clutch transmission, said dual clutch transmission (10) comprising:

said hydraulic circuit (310) including a source of pressurized cooling fluid (112);

first and second lube valves (316, 318) in fluid communication with said source of pressurized fluid (112), each of said first and second lube valves (316, 318) including a lube valve body (418) and a lube valve member (420) movably supported in said lube valve body to selectively and independently provide a flow of cooling fluid to each of the clutches 34, 34) dual clutch transmission with each of said lube valves including a biasing member (425) that acts on said lube valve member (420) to bias it to a normallv closed position and a solenoid (430), said solenoid adapted to move said lube valve, member (420) against the bias of said biasing member to produce a flow area through said lube valve that is an inverse function of the current delivered to said solenoid (430) to selectively open said first and second lube valves (316,318) thereby delivering a controlled, predetermined amount of cooling fluid to the clutches (32, 34) of the dual clutch transmission (10).

6. The dual clutch transmission (10) as set forth in claim 5 further including first and second clutch actuation valves (124, 126) in fluid communication with said source of pressurized cooling fluid (112) and a corresponding one of the two clutches (32, 34) of the dual clutch transmission, each of said first and second clutch actuation valves (124, 126) adapted to provide pressurized fluid to each of a corresponding one of the clutches of a dual clutch transmission to actuate same.

7. The clutch transmission (10) as set forth in claim 5 further including a main pressure regulator (114) in fluid communication with said source of pressurized fluid (112) and adapted to provide a predetermined set system pressure for said hydraulic circuit (310).

8. The dual clutch transmission (10) as set forth in claim 7 wherein said main pressure regulator (114) is disposed in fluid communication between said source of pressurized cooling fluid (112) and said first and second lube valves (316, 318).

9. A dual clutch transmission (10) having a hydraulic circuit (510) for controlling and cooling the clutches (32, 34) of the dual clutch transmission, said dual clutch transmission comprising:

said hydraulic circuit (510) having a source of pressurized cooling fluid (112);

a lube valve (516) in fluid communication with said source of pressurized fluid (112), said lube valve including a lube valve body (518) and a lube valve member (520) movably supported in said lube valve body (518) to selectively provide a flow of cooling fluid to the clutches (32, 34) of the dual clutch transmission, said lube valve (516) including a biasing member (625) that acts on said lube valve member (620) to bias it to a normally closed position;

a control actuator (520) in fluid communication with said with valve (516) and adapted to selectively control said lube valve, said control actuator (520) in fluid communication with said source of pressurized cooling fluid (112) and including all an actuator valve body (626), an actuator valve member (628) movably supported by said actuator valve body (626) and a solenoid (630), said solenoid (630) adapted to move said actuator valve member (628) of said control actuator to produce a control signal pressure from said control actuator that is an inverse function of the current delivered to said solenoid (630) and to deliver a predetermined amount of pressurized fluid to said lube valve member of said tube valve (516) to move said lube valve member (520) against the bias of said biasing, member (625) to thereby deliver a controlled, predetermined amount of cooling fluid through said lube valve (516); and a cooling switch valve (523) in fluid communication with said valve (516), said cooling switch valve adapted to deliver a controlled, predetermined amount of cooling fluid received from said lube valve (516) to alternate ones of the clutches (32, 34) of a dual clutch transmission.

10. The dual clutch transmission (10) as set forth in claim 9 further including first and second clutch actuation (124, 126) in fluid communication with said source of pressurized cooling fluid (112) and a corresponding one of the two clutches (32, 34) of the dual clutch transmission, each of said first and second clutch actuation valves (124, 126) adapted to provide pressurized fluid to each of a corresponding one of the clutches of a dual clutch transmission to actuate same.

11. The dual clutch transmission (10) as set forth in claim 9 wherein said cooling switch valve (523) includes a switch valve body (525) and a switch valve member (527) movably supported in said switch valve body (525), said cooling switch valve (523) being controlled by the actuation of said clutch actuation valves (124, 126).

12. The dual clutch transmission (l0) as set or in claim 11 wherein said cooling switch valve (523) receives, a pressure bias on one side of said switch valve member (527) delivered by said first clutch actuation valve (124) to bias the switch valve member (527) so as to provide direct cooling fluid through said cooling switch valve to one of the clutches of the dual clutch transmission.

13. The dual clutch transmission as set forth in claim 12 wherein said cooling switch valve (523) is adapted to receive a bias on the opposite side of said switch valve member (527) delivered from the second clutch actuation valve (126) to direct cooling fluid through the cooling switch valve (523) to the other clutch of the dual clutch transmission.

14. A dual clutch transmission (10) having a hydraulic circuit (810) for controlling and cooling the clutches (32, 34) of the dual clutch transmission, said dual clutch transmission comprising:

said hydraulic circuit (810) including a source of pressurized cooling fluid (112);

a lube valve(816) in fluid communication with said source of pressurized fluid (112), said lube valve including a lube vale body 818 and a lube valve member (820) movably supported in said lube valve body to selectively and independently provide a flow of cooling fluid to each of the clutches (32, 34) of the dual clutch transmission, said lube valve (816) further including a biasing member (925) the acts on said lube valve member (820) to bias it to a normally closed position and a solenoid (930), said solenoid adapted to move said lube valve member (820) against the bias of said biasing member (925) to produce a flow area through said lube valve that is an inverse function of the current delivered to said solenoid (930) to selectively open said lube valve (816); and a cooling switch valve (823) in fluid communication with said lube valve (816), said cooling switch valve (823) adapted to deliver a controlled, predetermined amount of cooling fluid received switch valve (823) adapted to deliver a controlled, predetermined amount of cooling fluid received from said lube valve (816) to alternate ones of the clutches (32, 34) of a dual clutch transmission.

15. The dual clutch transmission (10) as set forth in claim 14 further including first and second clutch actuation valves (124, 126) in fluid communication with said source of pressurized cooling fluid (112) and a corresponding one of the two clutches (32, 34) of the dual clutch transmission, each of said first and second clutch actuation valves (124, 126) adapted to provide pressurized fluid to each of a corresponding one of the clutches of a dual clutch transmission to actuate same.

16. The dual clutch transmission (10) as set forth in claim 14 wherein said cooling switch valve (823) includes a switch valve body (825) and a switch valve member (827) movably supported in said valve body (825), said cooling switch valve (823) being controlled by the actuation of said clutch actuation valves (124, 126).

17. The dual clutch transmission (10) as set forth in claim 16 wherein said cooling switch valve (823) receives a pressure bias on one side of said switch valve member (827) delivered by said first clutch actuation valve (124) to bias said switch valve member (827) so as to provide direct cooling fluid through said cooling switch valve (823) to one of the clutches of the dual clutch transmission.

18. The dual clutch transmission (10) as set forth in claim 17 wherein said cooling switch valve (823) is adapted to receive a bias on the opposite side of said switch valve member (827) delivered from the second clutch actuation valve (126) to direct cooling fluid through the cooling switch valve (823) to the other clutch of the dual clutch transmission.

19. The dual clutch transmission (10) as set forth in claim 14 further including a main pressure regulator (114) in fluid communication with said source of pressurized fluid and adapted to provide a predetermined set system pressure for said hydraulic circuit (810).

20. The dual clutch transmission (10) as set forth in claim 19 wherein said main pressure regulator (114) is disposed in fluid communication between said source of pressurized. cooling fluid (112) and said lube control valve (816).

* * * * *

UNITED STATES PATENT AND TRADEMARK OFFICE
CERTIFICATE OF CORRECTION

PATENT NO. : 8,443,956 B2
APPLICATION NO. : 12/920471
DATED : May 21, 2013
INVENTOR(S) : Bauer et al.

It is certified that error appears in the above-identified patent and that said Letters Patent is hereby corrected as shown below:

In the Claims

Column 15, line 25 delete "o" and insert therefor --of--.

Column 15, line 37 delete "at" and insert therefor --in--.

Column 15, line 54 delete "amoral" and insert therefor --amount--.

Column 15, line 65 insert --in-- between "as set forth" and "claim 1".

Column 16, line 21 delete "34, 34)" and insert therefor --(32, 34)--.

Column 16, line 21 insert --of the-- before "dual clutch transmission".

Column 16, line 24 delete "normallv" and insert therefor --normally--.

Column 16, line 41 insert --dual-- before "clutch transmission".

Column 16, line 67 delete "with" and insert therefor --lube--.

Column 17, line 3 delete "all".

Column 17, line 11 delete "tube" and insert therefor --lube--.

Column 17, line 13 delete "," after "biasing".

Column 17, line 14 delete "," after "controlled".

Column 17, line 17 insert --lube-- between "said" and "valve"

Column 17, line 23 insert --valves-- after "actuation".

Column 17, line 36 delete "or" and insert therefor --forth--.

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,443,956 B2

In the Claims

Column 17, line 37 delete "," after "receives".

Column 17, line 57 delete "vale" and insert therefor --valve--.

Column 18, line 5 delete "the" and insert therefor --that--.

Column 18, line 15, 16 & 17 delete "switch valve (823) adapted to deliver a controlled, predetermined amount of cooling fluid received".

Column 18, line 31 insert --switch-- between "said" and "valve".